United States Patent
Noguchi et al.

(10) Patent No.: US 11,647,126 B2
(45) Date of Patent: May 9, 2023

(54) SERVER FOR RECEIVING REMAINING AMOUNT INFORMATION, PRINTER FOR SENDING REMAINING AMOUNT INFORMATION, AND NON-TRANSITORY COMPUTER-READABLE RECORDING MEDIA STORING COMPUTER READABLE INSTRUCTIONS FOR SERVER AND PRINTER

(71) Applicant: BROTHER KOGYO KABUSHIKI KAISHA, Nagoya (JP)

(72) Inventors: Sho Noguchi, Mizunami (JP); Tomohiro Inagaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/324,242

(22) Filed: May 19, 2021

(65) Prior Publication Data

US 2021/0368047 A1 Nov. 25, 2021

(30) Foreign Application Priority Data

May 25, 2020 (JP) .............................. JP2020-090816

(51) Int. Cl.
  *G06F 11/16* (2006.01)
  *H04N 1/00* (2006.01)
  *H04N 1/46* (2006.01)

(52) U.S. Cl.
  CPC .......... *H04N 1/00244* (2013.01); *H04N 1/46* (2013.01)

(58) Field of Classification Search
  CPC . H04N 1/2346; H04N 1/00244; G06F 3/1235
  (Continued)

(56) References Cited

U.S. PATENT DOCUMENTS 7,254,563 B1 *  8/2007  Gelfer ................ G07B 17/0008
                                                 705/401
7,845,750 B2 * 12/2010  Kobayashi ............ B41J 2/1752
                                                 347/85

(Continued)

FOREIGN PATENT DOCUMENTS

JP  2015-075701 A  4/2015
JP  2017-228182 A  12/2017

OTHER PUBLICATIONS

Extended European Search Report dated Oct. 7, 2021 from related EP 21169791.7.

*Primary Examiner* — Jamares Q Washington
(74) *Attorney, Agent, or Firm* — Scully, Scott, Murphy & Presser, P.C.

(57) ABSTRACT

A server may receive remaining amount information related to a remaining amount of color material in a first color material cartridge from a printer on which the first color material cartridge is mounted, and send specific information to an external device in a case where the remaining amount of the color material in the first color material cartridge indicated by the remaining amount information is equal to or less than a first remaining amount threshold. The specific information is for changing a state of the printer from a state in which the printing process by using a second color material cartridge to be mounted is restricted to a state in which the printing process by using the second color material cartridge is permitted.

20 Claims, 9 Drawing Sheets

(58) Field of Classification Search
USPC ............... 358/1.15, 1.13, 1.14, 3.24; 347/19
See application file for complete search history.

(56) References Cited

U.S. PATENT DOCUMENTS

| | | | |
|---|---|---|---|
| 2008/0174624 A1* | 7/2008 | Sudo | B41J 29/38 |
| | | | 347/14 |
| 2011/0191198 A1* | 8/2011 | Rise | G06Q 30/0601 |
| | | | 705/26.1 |
| 2015/0104200 A1 | 4/2015 | Matsumoto | |
| 2017/0371271 A1* | 12/2017 | Miyazawa | G03G 15/5079 |
| 2017/0374209 A1 | 12/2017 | Kawakami | |
| 2019/0101864 A1 | 4/2019 | Nagasaki | |

\* cited by examiner

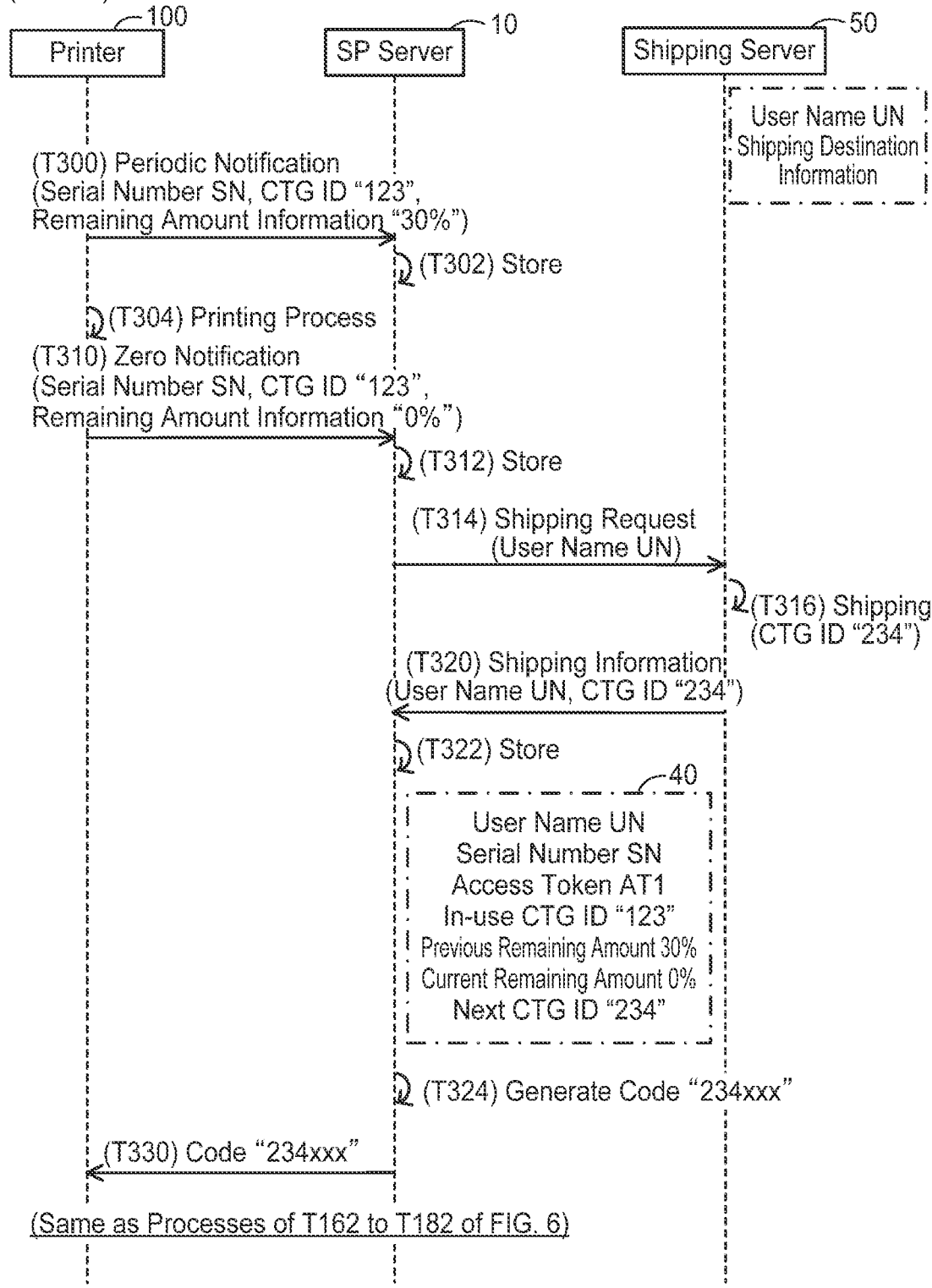

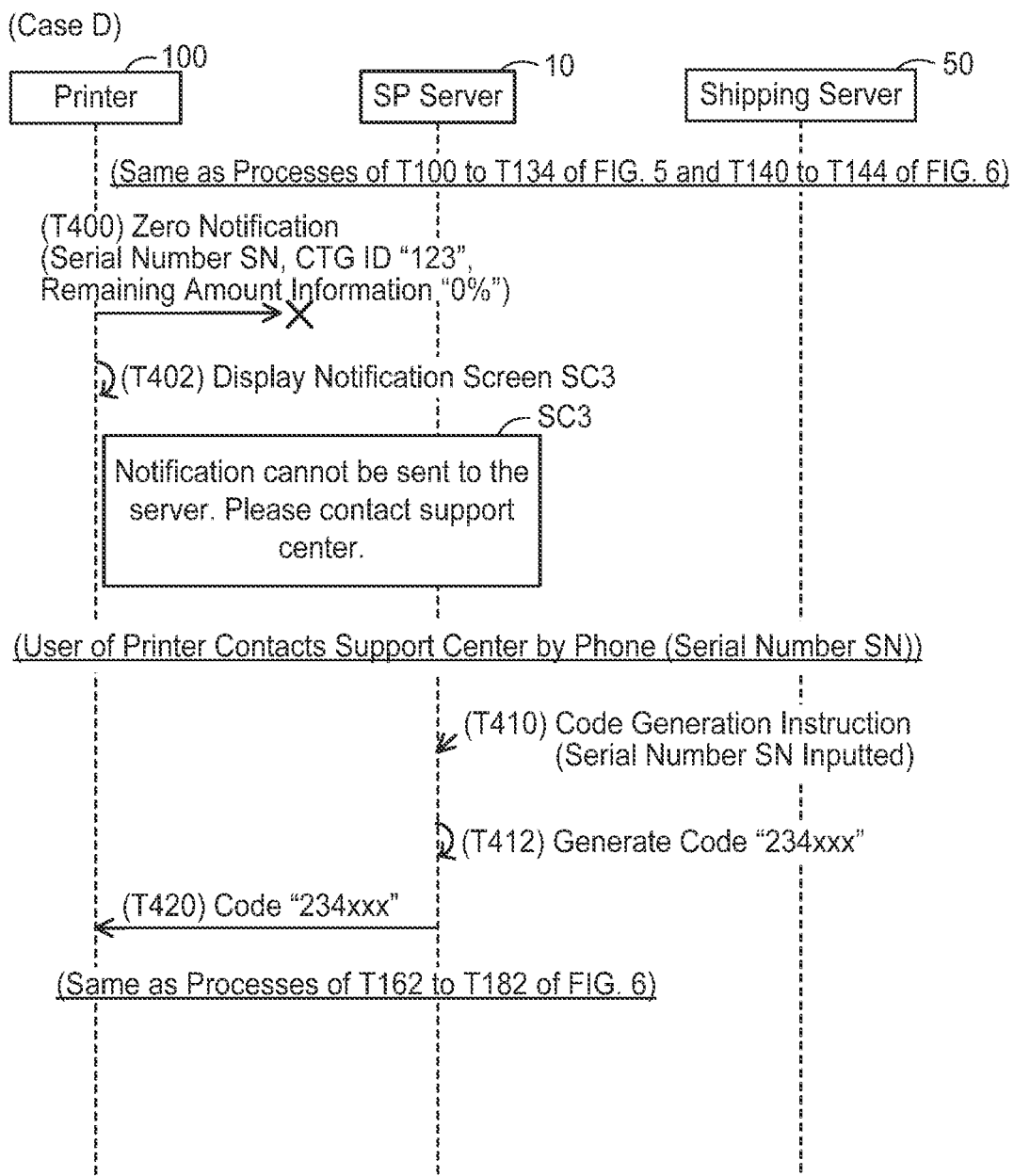

SERVER FOR RECEIVING REMAINING AMOUNT INFORMATION, PRINTER FOR SENDING REMAINING AMOUNT INFORMATION, AND NON-TRANSITORY COMPUTER-READABLE RECORDING MEDIA STORING COMPUTER READABLE INSTRUCTIONS FOR SERVER AND PRINTER

CROSS-REFERENCE TO RELATED APPLICATION

This application claims priority to Japanese Patent Application No. 2020-090816, filed on May 25, 2020, the entire contents of which are incorporated herein by reference.

TECHNICAL FIELD

The disclosure herein relates to art that restricts execution of a printing process using a cartridge mounted in a printer.

BACKGROUND

An image forming device is known. When a new toner cartridge is mounted thereon in place of a currently mounted toner cartridge in a state where toner is not remaining in the currently mounted toner cartridge, the image forming device writes identification information in the new toner cartridge and stores the identification information. When the new toner cartridge is mounted in place of the currently mounted toner cartridge in a state where some toner is still remaining in the currently mounted toner cartridge (i.e., a state in which identification information of this toner cartridge is stored), the image forming device determines that identification information of the new toner cartridge does not match the stored identification information and prohibits image formation using the new toner cartridge.

SUMMARY

Provided herein is a different approach for restricting execution of a printing process using a new color material cartridge different from a color material cartridge in which a relatively large amount of color material is still remaining.

A server disclosed herein may include a controller. The controller may be configured to: receive remaining amount information related to a remaining amount of color material in a first color material cartridge from a printer on which the first color material cartridge is mounted, wherein the printer is configured to execute a printing process by using a color material cartridge; and send specific information to an external device in a case where the remaining amount information is received from the printer and the remaining amount of the color material in the first color material cartridge indicated by the remaining amount information is equal to or less than a first remaining amount threshold, wherein the specific information is for changing a state of the printer from a state in which the printing process using a second color material cartridge to be mounted instead of the first color material cartridge is restricted to a state in which the printing process using the second color material cartridge is permitted in a case where the specific information is obtained by the printer in response to the specific information being sent to the external device.

Also, a printer disclosed herein may include: a print executing unit on which a color material cartridge is mounted; and a controller. The controller may be configured to: cause the print executing unit to execute a printing process by using the color material cartridge; in a case where a first color material cartridge is mounted on the print executing unit, send to a server remaining amount information related to a remaining amount of color material in the first color material cartridge; and obtain specific information, wherein the specific information is sent from the server to an external device in a case where the remaining amount of the color material in the first color material cartridge indicated by the remaining amount information which has been sent to the server is equal to or less than a first remaining amount threshold, wherein the controller may be configured to: before the specific information is obtained, restrict the printing process using a second color material cartridge to be mounted instead of the first color material cartridge; and in a case where the specific information is obtained, permit the printing process using the second color material cartridge.

A computer program and a non-transitory computer-readable medium storing computer-readable instructions for the server are also novel and useful. A computer program and a non-transitory computer-readable medium storing computer-readable instructions for the printer are also novel and useful. A method implemented by the server and a method implemented by the printer are also novel and useful. Moreover, a communication system comprising the above server and printer is also novel and useful.

BRIEF DESCRIPTION OF DRAWINGS

FIG. 8 shows a sequence diagram of Case C;
and
FIG. 9 shows a sequence diagram of Case D.

DETAILED DESCRIPTION

Figure 1:
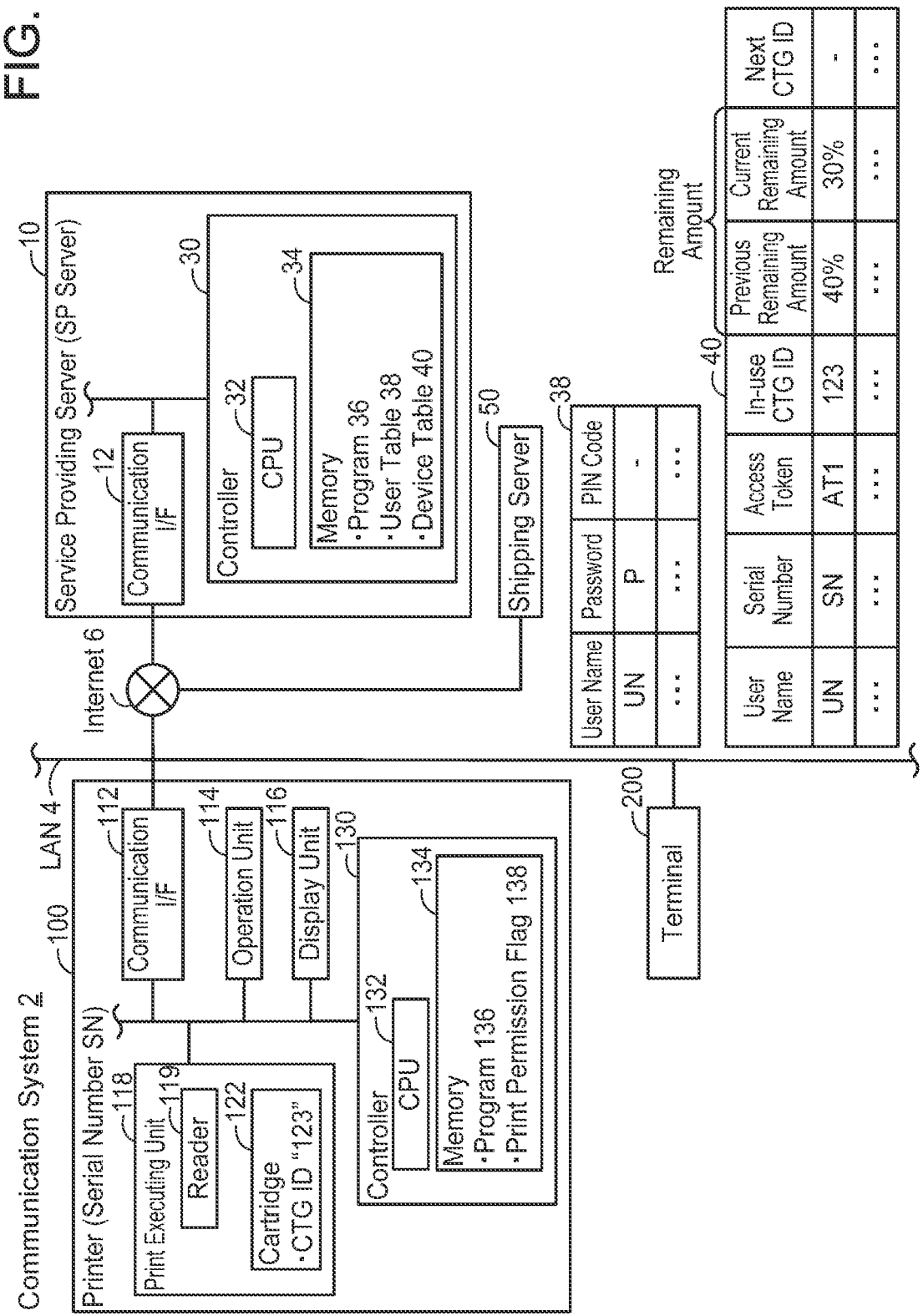
FIG. 1 shows a configuration of a communication system.

Configuration of Communication System 2; FIG. 1

As shown in FIG. 1, a communication system 2 includes a service providing server (hereinbelow, the service providing server will simply be termed "SP server") 10, a shipping server 50, a printer 100, and a terminal 200. The printer 100 and the terminal 200 are connected to the same Local Area Network (LAN) 4. The LAN 4 may be a wired LAN or a wireless LAN. The LAN 4 is connected to the Internet 6. The SP server 10 and the shipping server 50 are provided on the Internet 6. Devices that belong to the LAN 4 (e.g., the printer 100) are communicable with the SP server 10 via the LAN 4 and the Internet 6.

Configuration of Printer 100

The printer 100 is a peripheral device (i.e., a peripheral device of the terminal 200, etc.) configured to execute a printing function. A serial number SN, which is identification information for identifying the printer, is assigned to the printer 100. The serial number SN is one of unique character strings assigned respectively to printers when the plurality of printers is manufactured. The printer 100 includes a communication interface 112, an operation unit 114, a display unit 116, a print executing unit 118, and a controller 130. Hereinbelow, an interface will be termed "I/F".

The communication I/F 112 is an I/F for connecting to the LAN 4. The operation unit 114 includes a plurality of keys. A user can input various instructions to the printer 100 via the operation unit 114. The display unit 116 is a display configured to display various types of information. The display unit 116 may function as a so-called touch screen (i.e., an operation unit).

The print executing unit 118 includes a printing mechanism of inkjet scheme or laser scheme. A cartridge (hereinbelow simply termed "CTG") 122 containing a color material (such as ink, toner, etc.) is mounted on the print executing unit 118. The print executing unit 118 is configured to execute a printing process by using the color material in the CTG 122. In the present embodiment, one of a single-purpose CTG and a general-purpose CTG is mounted on the print executing unit 118. The single-purpose CTG is a CTG for receiving a flat-rate printing service provided by the SP server 10. The general-purpose CTG is a commercially available, general CTG. While the general-purpose CTG is mounted, the flat-rate printing service cannot be received.

The print executing unit 118 includes a reader 119. The reader 119 is configured to read a CTG ID (which is "123" in the example of FIG. 1) stored in the CTG 122 when the CTG 122 is mounted on the print executing unit 118. The CTG ID is identification information for identifying the CTG.

The controller 130 includes a CPU 132 and a memory 134. The CPU 132 is configured to execute various processes according to a program 136 stored in the memory 134. The memory 134 is configured of a volatile memory, a nonvolatile memory, and the like. The memory 134 further stores a print permission flag 138.

The print permission flag 138 indicates one of a value "ON", which indicates that the execution of the printing process using the single-purpose CTG mounted on the printer 100 is permitted, and a value "OFF", which indicates that the execution of the printing process using the single-purpose CTG mounted on the printer 100 is restricted. In the present embodiment, "the execution of the printing process is restricted" means that the execution of the printing process using the single-purpose CTG is prohibited.

Configuration of Terminal 200

The terminal 200 is a terminal device such as a stationary PC, a note PC, a portable terminal (e.g., smartphone), or the like.

Configuration of SP Server 10

The SP server 10 is installed on the Internet 6 by a vendor of the printer 100. In a variant, the SP server 10 may be installed by a business entity different from the vendor. The SP server 10 is configured to provide the flat-rate printing service to printers (e.g., 100). The flat-rate printing service is a service that allows printing on the preset number of print mediums (e.g., 200 sheets) at a fixed rate every predetermined period (e.g., every month). Further, the SP server 10 manages a remaining amount of the color material in a single-purpose CTG mounted on a printer. The SP server 10 requests the shipping server 50 to ship a new single-purpose CTG when the remaining amount satisfies a predetermined condition.

The SP server 10 includes a communication I/F 12 and a controller 30. The communication I/F 12 is connected to the Internet 6. The controller 30 includes a CPU 32 and a memory 34. The CPU 32 is configured to execute various processes according to a program 36 stored in the memory 34. The memory 34 is configured of a volatile memory, a nonvolatile memory, and the like. The memory 34 further stores a user table 38 and a device table 40.

One or more pieces of user information are registered in the user table 38. Each user information includes a user name (e.g., UN) for identifying a user and a password (e.g., P) for authenticating the user. Each user information may be associated with a Personal Identification Number (PIN) code. The PIN code is used when information related to a printer is registered in the SP server 10.

One or more pieces of information related to one or more printers are registered in the device table 40. Specifically, a user name, a serial number, an access token, an in-use CTG ID, remaining amount information, and a next CTG ID are stored in association with each other.

The access token is authentication information used to establish an Extensible Messaging and Presence Protocol (XMPP) connection, which is a so-called full-time connection, between the SP server 10 and a printer. For example, when an XMPP connection is established between the SP server 10 and the printer 100, the SP server 10 on the Internet 6 can send information to the printer 100 beyond a firewall of the LAN 4 without receiving a request from the printer 100 in the LAN 4.

The in-use CTG ID is a CTG ID (e.g., "123") of a single-purpose CTG that the printer is permitted to use in a printing process (hereinbelow such CTG may be termed "in-use CTG"). The remaining amount information indicates remaining amount of the color material in the in-use CTG. The remaining amount information includes a previous remaining amount and a current remaining amount. The next CTG ID is a CTG ID for identifying a single-purpose CTG that is to be newly mounted when the color material in the in-use CTG has run out.

Configuration of Shipping Server 50

The shipping server 50 may be installed on the Internet 6 by the vendor of the printer 100 or by a business entity different from the vendor. The shipping server 50 is configured to ship a single-purpose CTG in response to a request from the SP server 10. The shipping server 50 stores a user name and shipping destination information (e.g., address) in association with each other.

Figure 2:
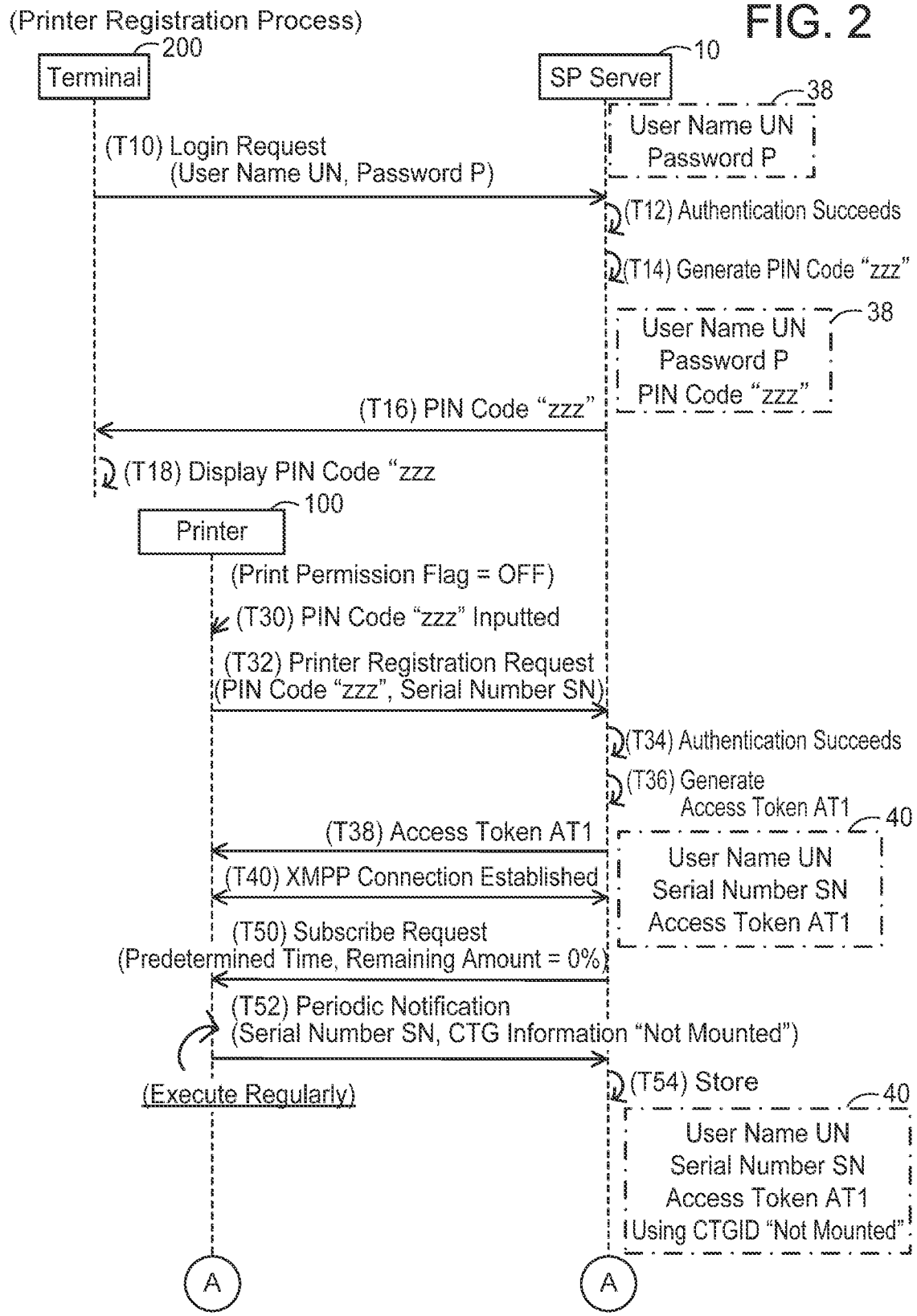
FIG. 2 shows a sequence diagram of a process for registering a printer in a service providing server.

Printer Registration Process; FIG. 2

Next, a process for registering information related to the printer 100 in the SP server 10 will be described with reference to FIG. 2. In the sequence diagrams to be described, processes executed by the CPUs 32 and 132 of the SP server 10 and the printer 100 will be described with the SP server 10 and the printer 100 as subjects of action instead of describing the CPUs 32 and 132 as the subjects of action, in order to facilitate understanding. In an initial state of FIG. 2, a user name UN and a password P have been already stored in the user table 38 of the SP server 10. Further, in the initial state of FIG. 2, the print permission flag 138 of the printer 100 indicates OFF.

When the terminal 200 accepts, from a user, an operation of designating a Uniform Resource Locator (URL) of the SP server 10 and an operation of inputting the user name UN and the password P, the terminal 200 sends a login request including the user name UN and the password P to the SP server 10 in T10.

When receiving the login request from the terminal 200 via the communication I/F 12 in T10, the SP server 10 executes authentication for the user name UN and the password P included in the login request. In the present case, the combination of the user name UN and the password P has been already registered in the user table 38, and thus the SP server 10 determines that the authentication is successful in T12. In this case, the SP server 10 generates a PIN code "zzz" in T14 and stores the PIN code "zzz" in the user table 38 in association with the user name UN and the password P. Then, in T16, the SP server 10 sends the PIN code "zzz" to the terminal 200 via the communication I/F 12. Every communication executed by the SP server 10 hereinbelow is executed via the communication I/F 12. Therefore, the phrase "via the communication I/F 12" will be omitted hereinbelow.

When receiving the PIN code "zzz" from the SP server 10 in T16, the terminal 200 displays the PIN code "zzz" in T18. As a result, the user can acknowledge the PIN code "zzz".

When the printer 100 accepts input of the PIN code "zzz" from the user in T30, the printer 100 sends a printer registration request to the SP server 10 in T32 via the communication I/F 112. The printer registration request is a command for requesting the SP server 10 to register the serial number SN of the printer 100 and includes the PIN code "zzz" and the serial number SN. Every communication executed by the printer 100 hereinbelow is executed via the communication I/F 112. Therefore, the phrase "via the communication I/F 112" will be omitted hereinbelow.

When receiving the printer registration request from the printer 100 in T32, the SP server 10 executes authentication for the PIN code "zzz" included in the printer registration request. In the present case, the PIN code "zzz" has been already stored in the user table 38, and thus the SP server 10 determines that the authentication is successful in T34. In this case, the SP server 10 specifies the user name UN associated with the PIN code "zzz" in the user table 38. Then, in T36, the SP server 10 generates an access token AT1 and stores the specified user name UN, the serial number SN included in the printer registration request, and the generated access token AT1 in the device table 40 in association with each other. Then, the SP server 10 sends the access token AT1 to the printer 100 in T38.

When receiving the access token AT1 from the SP server 10 in T38, the printer 100 sends the access token AT1 to the SP server 10 and establishes an XMPP connection with the SP server 10 in T40.

After that, the SP server 10 uses the XMPP connection established in T40 to send a Subscribe request to the printer 100 in T50. The Subscribe request is a command that requests the printer 100 to repeatedly send, at a predetermined timing (e.g., at a predetermined time of the day), a notification including remaining amount information indicating a remaining amount of color material in a single-purpose CTG mounted on the printer 100. Hereinbelow, this notification will be termed "periodic notification". The Subscribe request is a command that further requests the printer 100 to send, in a case where the remaining amount of the color material in the single-purpose CTG mounted on the printer 100 is 0%, a notification indicating that the remaining amount of the color material in the single-purpose CTG has become 0% without waiting for the aforementioned predetermined timing to arrive. Hereinbelow, this notification will be termed "zero notification". Here, "the remaining amount of the color material in the single-purpose CTG is 0%" means that the printer 100 cannot execute a printing process using the color material in the single-purpose CTG due to the remaining amount of the color material in the single-purpose CTG having decreased. That is, "the remaining amount of the color material in the single purpose CTG is 0%" includes a state in which a little amount of the color material is still remaining in the single-purpose CTG. In a variant, the printer 100 may determine that "the remaining amount of the color material in the single purpose CTG is 0%" in a case where the printing process is executed on a predetermined number of printing medium (e.g., 100 sheets) in the printer 100 after the remaining amount of the color material in the single-purpose CTG reached a predetermined remaining amount (e.g., 20%).

When receiving the Subscribe request from the SP server 10 in T50, the printer 100 sends a periodic notification to the SP server 10 in T52 every time the aforementioned predetermined timing arrives. The periodic notification includes the serial number SN of the printer 100 and CTG information. When a single-purpose CTG is not mounted on the printer 100, the CTG information includes information indicating "not mounted" (see T52 of FIG. 2). When a single-purpose CTG is mounted on the printer 100, the CTG information includes the CTG ID of the single-purpose CTG and information indicating the remaining amount of the color material in the single-purpose CTG.

When receiving the periodic notification from the printer 100 in T52, the SP server 10 updates the device table 40 in T54. Specifically, the SP server 10 specifies the serial number SN included in the periodic notification received in T52 in the device table 40. Then, the SP server 10 stores the CTG information included in the periodic notification in the device table 40 in association with the specified serial number SN. In the example of T52 of FIG. 2, the CTG information includes the information indicating "not mounted". In this case, the SP server 10 stores the information indicating "not mounted" as the in-use CTG ID. When receiving the periodic notification from the printer 100, the SP server 10 sends the printer 100 a response signal indicating that the periodic notification has been normally received, although this is not shown in the drawings.

Figure 3:
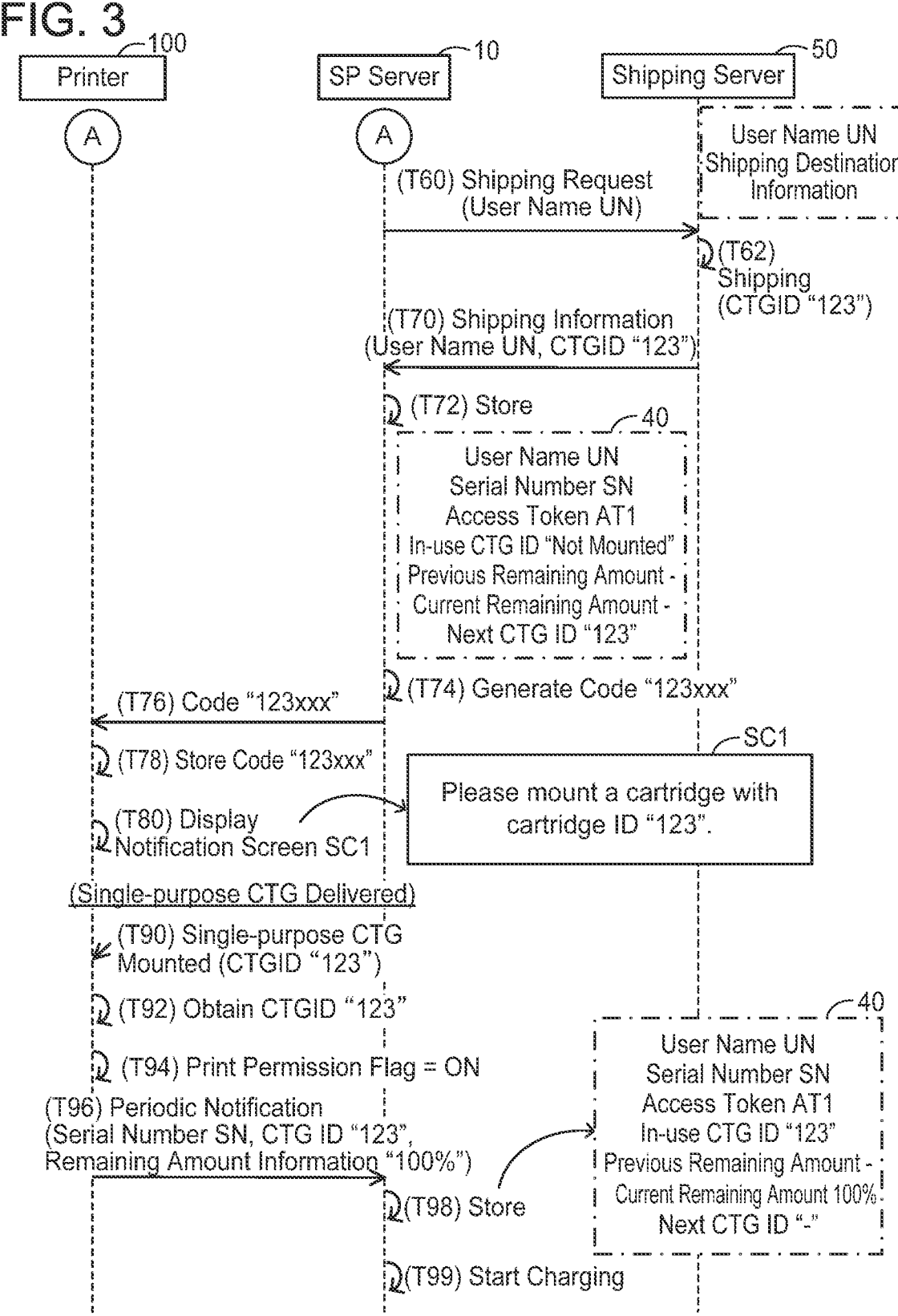
FIG. 3 shows a sequence diagram continuing from FIG. 2.

Continuation of FIG. 2; FIG. 3

When the SP server 10 stores the information indicating "not mounted" as the in-use CTG ID in T54 of FIG. 2, the SP server 10 sends a shipping request including the user name UN to the shipping server 50 in T60 of FIG. 3.

When receiving the shipping request from the SP server 10 in T60, the shipping server 50 executes a process for shipping a new single-purpose CTG to the user identified by the user name UN included in the shipping request in T62. Specifically, the shipping server 50 firstly specifies shipping destination information associated with the user name UN included in the shipping request. Then, the shipping server 50 ships a new single-purpose CTG with the specified shipping destination information as the destination. In the example of T62, the single-purpose CTG identified by a CTG ID "123" is shipped. Then, in T70, the shipping server 50 sends shipping information including the CTG ID "123" of the shipped single-purpose CTG and the user name UN included in the shipping request to the SP server 10.

When receiving the shipping information from the shipping server 50 in T70, the SP server 10 updates the device table 40 in T72. Specifically, the SP server 10 firstly specifies the user name UN included in the shipping information in the device table 40. Then, the SP server 10 stores the CTG ID "123" included in the shipping information as the next CTG ID in association with the specified user name UN.

In T74, the SP server 10 generates a code "123xxx" by adding a predetermined character string "xxx" to the CTG ID "123" obtained in T70. Then in T76, the SP server 10 sends the generated code "123xxx" to the printer 100. The code is information for changing the state of the printer 100 from the state in which the printing process using the single-purpose CTG identified by the CTG ID "123" included in the code "123xxx" is restricted (i.e., the state in which the print permission flag 138 indicates OFF) to the state in which the printing process using the single-purpose CTG is permitted (i.e., the state in which the print permission flag 138 indicates ON).

When receiving the code "123xxx" from the SP server 10 in T76, the printer 100 stores the code "123xxx" in the memory 134 in T78. At this time, the printer 100 determines whether the CTG ID obtained from the code (which is "123" in the present case) matches the CTG ID of the single-purpose CTG mounted on the print executing unit 118 (i.e., the CTG ID read by the reader 119). In a case where the former CTG ID matches the latter CTG ID, the printer 100 sets the print permission flag 138 to ON. On the other hand, in a case where the former CTG ID does not match the latter CTG ID, the printer 100 maintains the print permission flag 138 at OFF. In the example of T78, the printer 100 cannot obtain a CTG ID from the print executing unit 118 because a single-purpose CTG has not been mounted yet on the print executing unit 118. Therefore, the printer 100 determines that the former CTG ID does not match the latter CTG ID and maintains the print permission flag 138 at OFF.

In the case of determining that the former CTG ID does not match the latter CTG ID, the printer 100 causes the display unit 116 to display a notification screen SC1 in T80. The notification screen SC1 includes a message that prompts the user to mount the single-purpose CTG identified by the former CTG ID "123" to the print executing unit 118. Thus, the user can acknowledge that the single-purpose CTG should be mounted.

After that, the single-purpose CTG shipped by the shipping server 50 (see T62) is delivered to the user of the printer 100. Then, in T90, this single-purpose CTG is mounted to the print executing unit 118. The printer 100 obtains the CTG ID "123" from the reader 119 of the print executing unit 118 in T92. At this time, the printer 100 determines whether the CTG ID obtained from the stored code (see T78) matches the CTG ID obtained from the reader 119. In the present case, the printer 100 determines that the former CTG ID matches the latter CTG ID and sets the print permission flag 138 to ON in T94.

After that, the printer 100 sends a periodic notification to the SP server 10 in T96 in response to the arrival of the predetermined timing requested in T50 of FIG. 2. This periodic notification includes the serial number SN, the CTG ID "123" of the single-purpose CTG currently mounted on the print executing unit 118, and remaining amount information "100%" indicating the remaining amount of the color material in this single-purpose CTG.

When receiving the periodic notification from the printer 100 in T96, the SP server 10 updates the device table 40 in T98. Specifically, the SP server 10 firstly specifies the serial number SN included in the periodic notification in the device table 40. Then, the SP server 10 stores the CTG ID "123" included in the periodic notification as the in-use CTG ID and the remaining amount information "100%" included in the periodic notification as the current remaining amount in association with the specified serial number SN. Further, the SP server 10 deletes the next CTG ID "123" stored in association with the serial number SN (i.e., updates the next CTG ID to be empty).

As described, when the SP server 10 changes the in-use CTG ID associated with the serial number SN from the information indicating "not mounted" to the CTG ID "123", it determines that preparation for receiving the flat-rate printing service has been completed in the printer 100 identified by the serial number SN. In this case, the SP server 10 starts charging for the printing service in T99.

Figure 4:
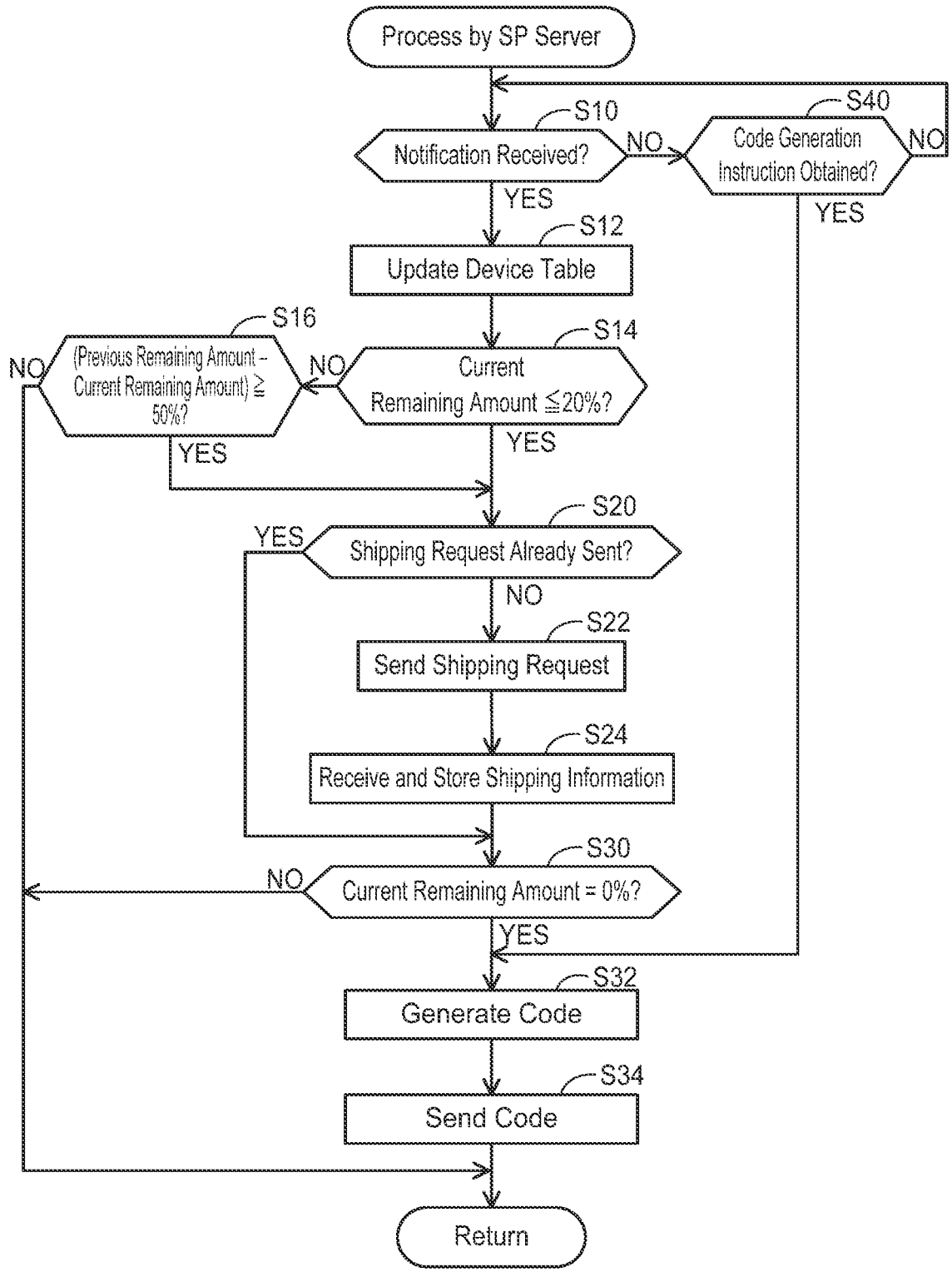
FIG. 4 shows a flowchart of a process executed by the service providing server.

Process by SP Server 10; FIG. 4

Next, a process executed by the CPU 32 of the SP server 10 will be described with reference to FIG. 4. The CPU 32 starts the process of FIG. 4 with the SP server 10 being turned on as a trigger. The process of FIG. 4 is executed to a printer to which the charging has been started (see T99 of FIG. 3). In S10, the CPU 32 monitors whether a notification is received from a printer (e.g., printer 100). In a case of receiving a periodic notification or a zero notification from a printer, the CPU 32 determines YES in S10 and proceeds to S12. Hereinbelow, the notification received in S10 will be termed "target notification" and the printer that had sent the target notification will be termed "target printer". The target notification includes a serial number of the target printer (hereinbelow termed "target serial number"), a CTG ID of a single-purpose CTG mounted on the target printer (hereinbelow termed "target CTG"), and remaining amount information indicating a remaining amount of color material in the target CTG.

In S12, the CPU 32 updates the device table 40. Specifically, the CPU 32 firstly stores the current remaining amount that is currently associated with the target serial number as the previous remaining amount. Then, the CPU 32 stores the remaining amount information included in the target notification as the current remaining amount in association with the target serial number.

In S14, the CPU 32 determines whether the current remaining amount stored in S12 is no more than 20%. That is, the CPU 32 determines whether the color material in the target CTG will run out in the near future. The threshold used in S14 may be less than 20% (e.g., 10%), or may be greater than 20% (e.g., 30%). In a case where the current remaining amount is equal to or less than 20%, the CPU 32 determines YES in S14 and proceeds to S20. On the other hand, in a case where the current remaining amount is greater than 20%, the CPU 32 determines NO in S14 and proceeds to S16.

In S16, the CPU 32 determines whether a difference between the current remaining amount stored in S12 and the previous remaining amount stored in S12 is no less than 50%. That is, the CPU 32 determines whether the printing process was executed on a large number of print mediums in the printer 100 within a short period of time. The threshold used in S16 may be less than 50% (e.g., 40%), or may be greater than 50% (e.g., 60%). In a case where the difference is equal to or greater than 50%, the CPU 32 determines YES in S16 and proceeds to S20. The determination of YES is made in S16 in a situation in which the color material in the target CTG will run out soon if the printing process is executed at the same pace in the printer 100. On the other hand, in a case where the difference is less than 50% (including a case in which the previous remaining amount is not stored), the CPU 32 determines NO in S16 and terminates the process of FIG. 4.

In S20, the CPU 32 determines whether a shipping request has been sent to the shipping server 50. Specifically, the CPU 32 determines whether a next CTG ID is stored in association with the target serial number in the device table 40. In a case where a next CTG ID is stored, the CPU 32 determines that a shipping request has been already sent (YES in S20), skips processes of S22 and S24, and proceeds to S30. On the other hand, in a case where a next CTG ID is not stored in association with the target serial number, the CPU 32 determines that a shipping request has not been sent (NO in S20) and proceeds to S22.

In S22, the CPU 32 sends a shipping request to the shipping server 50. This shipping request includes a user name stored in the device table 40 in association with the target serial number (hereinbelow termed "target user name"). As a result, the shipping server 50 ships a single-purpose CTG with shipping destination information associated with the target user name as the destination (see T62 of FIG. 3). Then, shipping information including the target user name and the CTG ID of the single-purpose CTG is sent from the shipping server 50 to the SP server 10 (see T70).

In S24, the CPU 32 receives the shipping information from the shipping server 50. Then, the CPU 32 stores the CTG ID included in the shipping information as a next CTG ID in the device table 40 in association with the target user name included in the shipping information.

In S30, the CPU 32 determines whether the current remaining amount stored in S12 is 0%. In a case where the current remaining amount is 0%, the CPU 32 determines YES in S30 and proceeds to S32. On the other hand, in a case where the current remaining amount is greater than 0%, the CPU 32 determines NO in S30 and terminates the process of FIG. 4.

In S32, the CPU 32 generates a code. Specifically, the CPU 32 generates the code by adding the predetermined letter string "xxx" to the next CTG ID stored in S24.

In S34, the CPU 32 uses an XMPP connection to send the code generated in S32 to the target printer. As a result, the target printer obtains the code and is brought to the state in which the execution of the printing process using the single-purpose CTG identified by the CTG ID included in the code is permitted (i.e., the print permission flag=ON) (see T94 of FIG. 3). As above, since the SP server 10 directly sends the code to the target printer, the user does not have to input the code to the target printer. Thus, user convenience is improved. When the process of S34 is completed, the process of FIG. 4 is terminated.

In S40, the CPU 32 monitors whether a code generation instruction is obtained. The code generation instruction is inputted to the SP server 10 by a worker for the vendor of the printer based on an instruction from the user of the printer. The code generation instruction includes the serial number of the printer. In a case where the code generation instruction is obtained, the CPU 32 determines YES in S40 and proceeds to S32. In this case, the CPU 32 generates a code in S32 by using the next CTG ID stored in the device table 40 in association with the serial number included in the code generation instruction. Then, in S34, the CPU 32 sends the generated code to the printer identified by the serial number.

Figure 5:
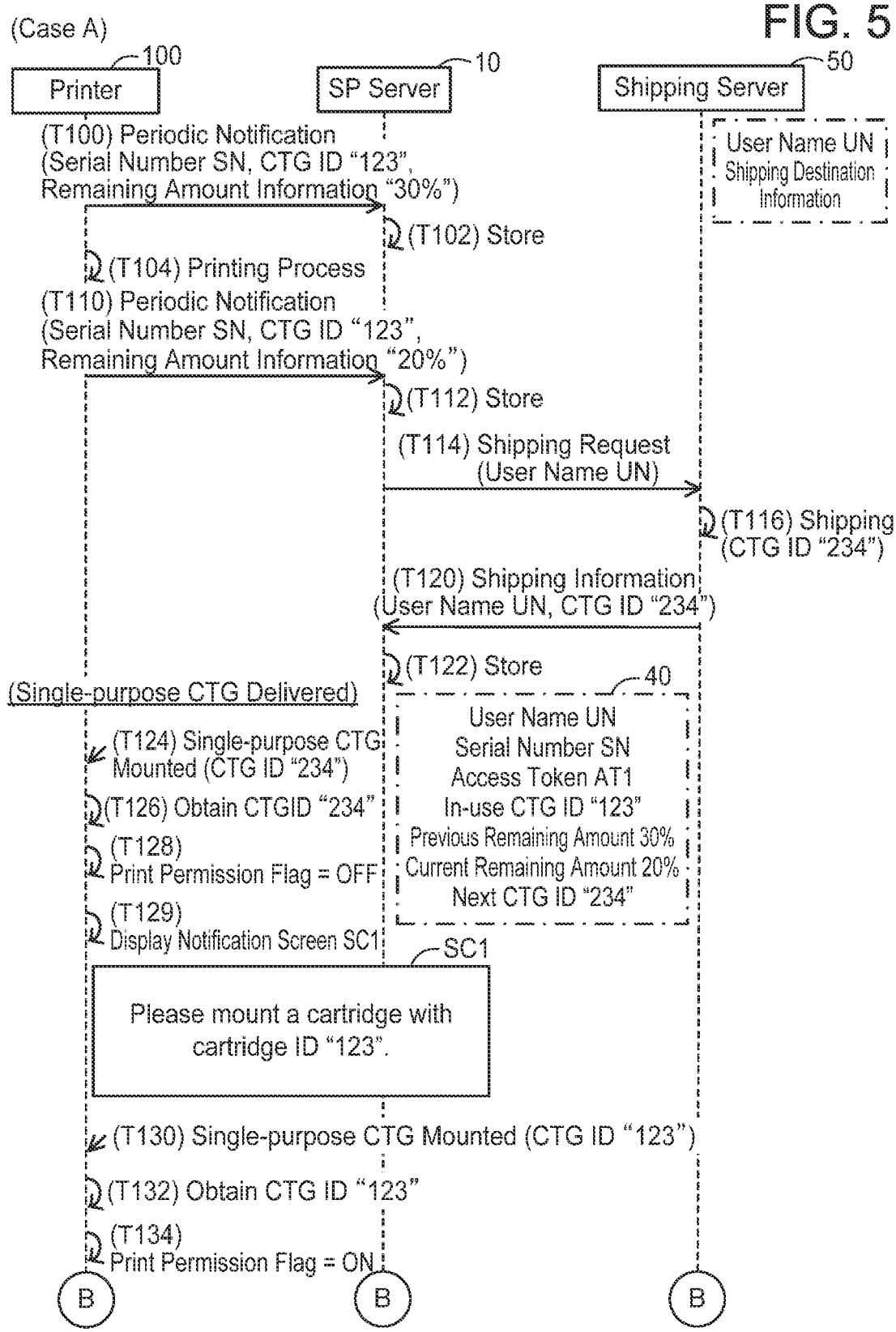
FIG. 5 shows a sequence diagram of Case A.

Case A; FIG. 5

Next, specific cases realized by the process of FIG. 4 will be described. Firstly, Case A will be described with reference to FIG. 5. In Case A, the process for shipping a new single-purpose CTG to the user of the printer 100 is executed in the state in which the single-purpose CTG identified by the CTG ID "123" (see T90 of FIG. 3) is mounted on the printer 100 and thereafter the remaining amount of the color material in the mounted single-purpose CTG (i.e., the CTG ID "123") becomes 0%. In an initial state of FIG. 5, the printer 100 has already stored the code "123xxx" (see T78) and the print permission flag 138 of the printer 100 indicates ON (see T94). Further, the SP server 10 has already stored the serial number SN of the printer 100, the in-use CTG ID "123", and the current remaining amount "40%" in the device table 40.

In T100, the printer 100 sends a periodic notification to the SP server 10. This periodic notification includes the serial number SN, the CTG ID "123", and the remaining amount information "30%".

When receiving the periodic notification from the printer 100 in T100 (YES in S10 of FIG. 4), the SP server 10 updates the device table 40 in T102 (S12). Specifically, the SP server 10 stores the current remaining amount ("40%" in the present case) associated with the serial number SN as the previous remaining amount, and also stores the remaining amount information "30%" included in the periodic notification as the current remaining amount. In this case, the SP server 10 determines that the current remaining amount "30%" stored in T102 is greater than 20% (NO in S14) and determines that the difference "10%" between the previous remaining amount "40%" and the current remaining amount "30%" is less than 50% (NO in S16). Thus, the SP server 10 does not send a shipping request to the shipping server 50 and does not generate a code.

In T104, the printer 100 executes the printing process. Therefore, the color material in the single-purpose CTG is consumed. After this, in T110, the printer 100 sends a periodic notification to the SP server 10. This periodic notification is the same as the periodic notification of T100 except that the remaining amount information is "20%".

When receiving the periodic notification from the printer 100 in T110 (YES in S10), the SP server 10 updates the device table 40 in T112 and stores the current remaining amount "20%" and the previous remaining amount "30%". In this case, the SP server 10 determines that the current remaining amount "20%" is equal to or less than 20% (YES in S14). Further, the SP server 10 determines that a shipping request has not been sent to the shipping server 50 (NO in S20) because no next CTG ID is stored in the device table 40 in association with the serial number SN. Thus, the SP server 10 sends a shipping request including the user name UN to the shipping server 50 in T114 (S22).

Processes of T116 to T122 are the same as the processes of T62 to T72 of FIG. 3 except that the CTG ID of a new single-purpose CTG to be shipped is "234". As a result, in T122, the SP server 10 stores the CTG ID "234" included in the shipping information received in T120 as the next CTG ID (S24). After this, the SP server 10 determines that the current remaining amount "20%" is not 0% (NO in S30) and does not generate a code.

As described, the SP server 10 sends the shipping request to the shipping server 50 (T114) in response to the remaining amount of the color material in the single-purpose CTG mounted on the printer 100 becoming equal to or less than 20% before the remaining amount becomes 0%. Here, a comparative example will be considered in which the shipping request is sent in response to the remaining amount of the color material in the single-purpose CTG mounted on the printer 100 becoming 0%. In the comparative example, the printer 100 cannot execute the printing process using the single-purpose CTG during a time period from when the color material in the single-purpose CTG mounted on the printer 100 has run out until a new single-purpose CTG is delivered to the user. This degrades user convenience. Contrary to this, in the present embodiment, a new single-purpose CTG can be delivered to the user before the color material in the single-purpose CTG mounted on the printer 100 runs out. Thus, the time period during which the printer 100 cannot execute the printing process using the single-purpose CTG can be reduced. This improves user convenience.

The new single-purpose CTG (i.e., CTG ID "234") is delivered to the user of the printer 100. In T124, the new single-purpose CTG (i.e., CTG ID "234") is mounted in place of the mounted single-purpose CTG (i.e., CTG ID "123") in a state in which the remaining amount of the color material in the mounted single-purpose CTG (i.e., CTG ID "123") is "20%". In this case, the printer 100 obtains the CTG ID "234" of the newly mounted single-purpose CTG in T126. Then, the printer 100 determines that the CTG ID "123" obtained from the currently stored code "123xxx" does not match the CTG ID "234" obtained in T126, and sets the print permission flag 138 to OFF in T128. That is, the printer 100 prohibits the execution of the printing process using the single-purpose CTG (i.e., CTG ID "234"). Thus, the execution of the printing process using the new single-purpose CTG is prohibited in the state in which a relatively large amount of the color material (remaining amount of 20% in the present case) is still remaining in the single-purpose CTG (i.e., CTG ID "123"). As a result, it is possible to prevent cessation of the use of the single-purpose CTG still containing the relatively large amount of the color material. A process of T129 is the same as the process of T80 of FIG. 3. Further, processes of T130 to T134 are the same as the processes of T90 to T94 of FIG. 3.

Figure 6:
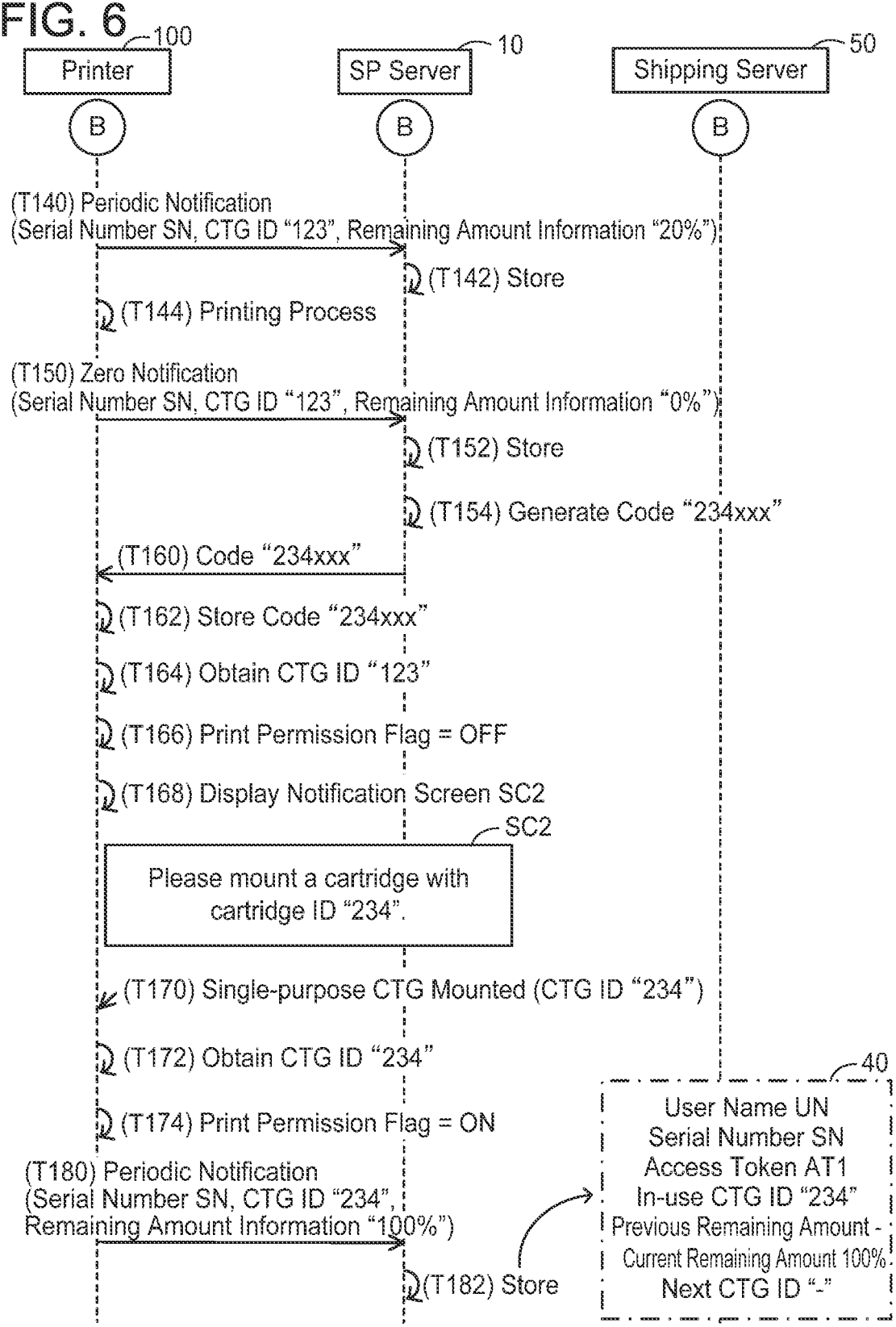
FIG. 6 shows a sequence diagram continuing from FIG. 5.

Continuation of FIG. 5; FIG. 6

Processes of T140 and T142 of FIG. 6 are the same as the processes of T110 and T112 of FIG. 5. In this case, the SP server 10 determines that the current remaining amount "20%" is equal to or less than 20% (YES in S14). Here, the SP server 10 determines that a shipping request has been already sent to the shipping server 50 (see T114) (YES in S20) because the next CTG ID "234" is stored in association with the serial number SN in the device table 40 (see T122 of FIG. 5), and does not send a shipping request to the shipping server 50. Further, the SP server 10 determines that the current remaining amount "20%" is not 0% (NO in S30) and does not generate a code.

In T144, the printer 100 executes the printing process. As a result, the remaining amount of the color material in the single-purpose CTG mounted on the printer 100 becomes 0%. In this case, the printer 100 sends a zero notification to the SP server 10 in T150. This zero notification includes the serial number SN, the CTG ID "123", and the remaining amount information "0%".

A process of T152 is the same as the process of T142 of FIG. 6. In this case, the SP server 10 determines that a shipping request has been already sent to the shipping server 50 (see T114 of FIG. 5) (YES in S20) and thus does not send a shipping request to the shipping server 50. Further, the SP server 10 determines that the current remaining amount is 0% (YES in S30), and generates a code "234xxx" including the next CTG ID "234" in T154.

Processes of T160 and T162 are the same as the processes of T76 and T78 of FIG. 3 except that the code "234xxx" is used. In this case, the printer 100 determines that the CTG ID "234" obtained from the code does not match the CTG ID "123" of the currently mounted single-purpose CTG obtained in T164, and sets the print permission flag 138 to OFF in T166. Then, in T168, the printer 100 causes the display unit 116 to display a notification screen SC2. The notification screen SC2 includes a message prompting the user to mount the single-purpose CTG identified by the CTG ID "234".

Processes of T170 to T174 are the same as the processes of T90 to T94 of FIG. 3 except that the single-purpose CTG used is different. In T180, the printer 100 sends a periodic notification including the serial number SN, the CTG ID "234", and the remaining amount information "100%" to the SP server 10.

When receiving the periodic notification from the printer 100 in T180 (YES in S10), the SP server 10 stores the CTG ID "234" as the in-use CTG ID, deletes the previous remaining amount, stores the current remaining amount "100%", and deletes the next CTG ID "234" in T182 (S12).

As described, the SP server 10 does not send the code including the CTG ID "234" of the new single-purpose CTG to the printer 100 unless the remaining amount of the color material in the single-purpose CTG (i.e., CTG ID "123") mounted on the printer 100 becomes 0%. That is, the printer 100 cannot obtain the code unless the remaining amount of the color material in the single-purpose CTG mounted on the printer 100 becomes 0%, and thus it prohibits the execution of the printing process using the new single-purpose CTG. This prevents the single-purpose CTG mounted on the printer 100 from being replaced with the new single-purpose CTG and the printing process from being executed using the new single-purpose CTG, despite a relatively large amount of the color material still remaining in the single-purpose CTG.

Further, as described, the code "234xxx" includes the next CTG ID "234". Therefore, the printer 100 can determine whether the CTG ID obtained from the code matches the CTG ID of the single-purpose CTG mounted on the printer 100. Thus, the printer 100 can suitably determine whether to permit the execution of the printing process using the mounted single-purpose CTG.

Figure 7:
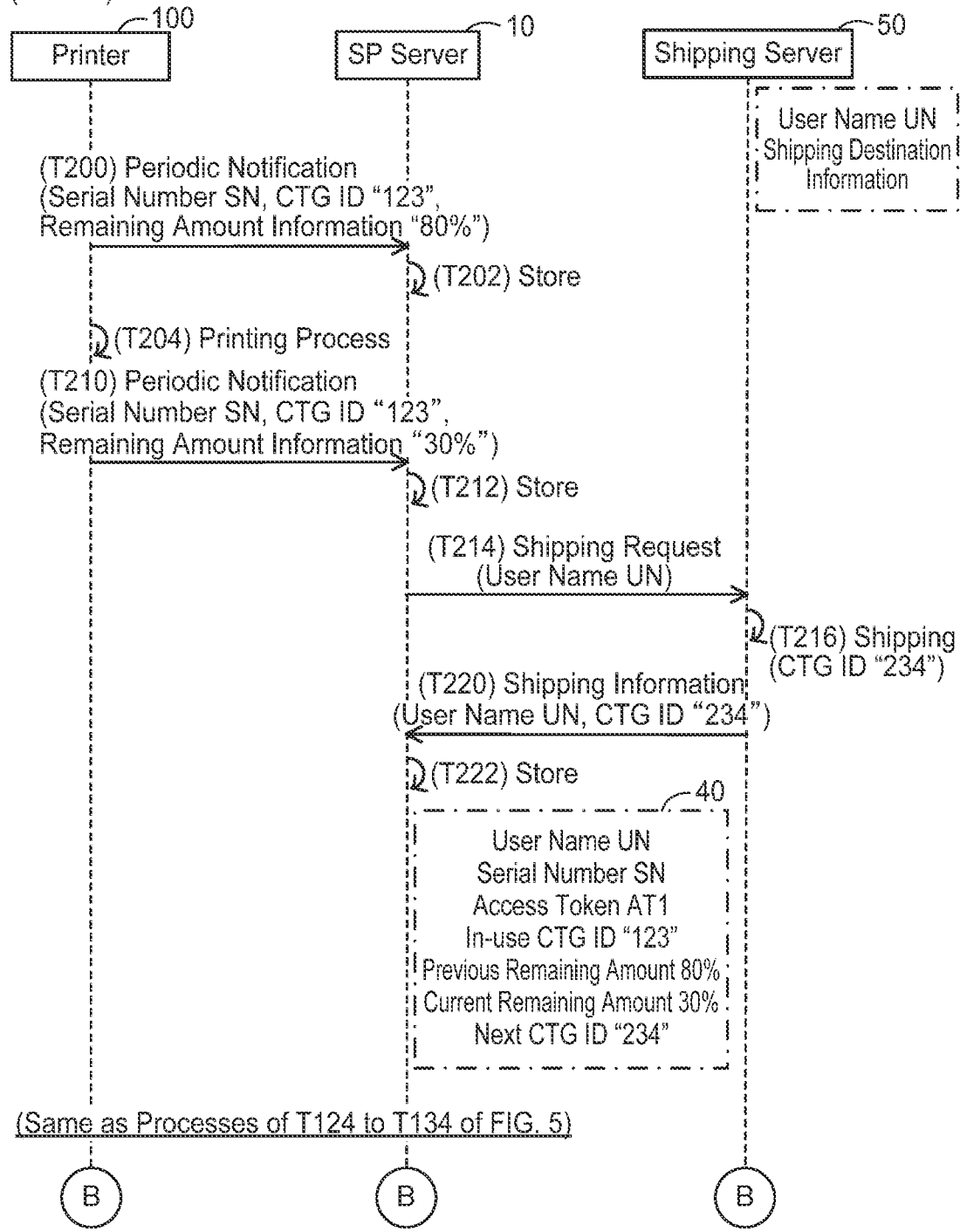
FIG. 7 shows a sequence diagram of Case B.

Case B; FIG. 7

Next, Case B will be described with reference to FIG. 7. Case B is another case in which the process for shipping a new single-purpose CTG to the user of the printer 100 is executed in the state in which the single-purpose CTG identified by the CTG ID "123" (see T90 of FIG. 3) is mounted on the printer 100 and thereafter the remaining amount of the color material in the mounted single-purpose CTG (i.e., the CTG ID "123") becomes 0%. An initial state of FIG. 7 is the same as the initial state of FIG. 5.

Processes of T200 to T212 of FIG. 7 are the same as the processes of T100 to T112 of FIG. 5 except that the remaining amount information included in the periodic notifications are different. In the present case, upon executing the process of T212, the SP server 10 determines that the current remaining amount "30%" is equal to or greater than 20% and the difference "50%" between the previous remaining amount "80%" and the current remaining amount "30%" is equal to or greater than "50%" (NO in S14, YES in S16). Further, the SP server 10 determines, based on the device table 40, that a shipping request has not been sent to the shipping server 50 (NO in S20). In response to this, the SP server 10 sends a shipping request to the shipping server 50 in T214 (S22). Processes of T216 to T222 are the same as the processes of T116 to T122 of FIG. 5. After this, processes same as T124 to T134 are executed and processes same as those of FIG. 6 are further executed.

As described, the SP server 10 sends the shipping request to the shipping server 50 (T214) in response to the difference between the previous remaining amount and the current remaining being equal to or greater than 50% before the remaining amount of the color material in the single-purpose CTG mounted on the printer 100 becomes 0%. That is, the SP server 10 can send the shipping request to the shipping server 50 when the remaining amount of the color material in the single-purpose CTG mounted on the printer 100 is expected to soon become 0%. Thus, the user of the printer 100 can obtain the new single-purpose CTG before the color material in the single-purpose CTG mounted on the printer 100 runs out. Therefore, user convenience is improved.

Case C; FIG. 8

Next, Case C will be described with reference to FIG. 8. In Case C, the remaining amount of the color material in the single-purpose CTG mounted on the printer 100 (i.e., CTG ID "123" (see T90 of FIG. 3)) becomes 0% before the process for shipping a new single-purpose CTG to the user of the printer 100 is executed. An initial state of FIG. 8 is the same as the initial state of FIG. 5.

Processes of T300 to T304 of FIG. 8 are the same as the processes of T100 to T104 of FIG. 5. However, in the present case, the remaining amount of the color material in the single-purpose CTG mounted on the printer 100 (i.e., CTG ID "123") becomes 0% in the printing process of T304. Thus, the printer 100 sends a zero notification to the SP server 10 in T310.

In T312, the SP server 10 stores "0%" as the current remaining amount (S12) and determines that the current remaining amount "0%" is equal to or less than 20% (YES in S14). In response to this, the SP server 10 sends a shipping request to the shipping server 50 (S22) in T314. Processes of T316 to T322 are the same as the processes of T116 to T122 of FIG. 5.

The SP server 10 further determines that the current remaining amount "0%" is 0% (YES in S30), generates a code "234xxx" including the next CTG ID "234" in T324, and sends the code "234xxx" to the printer 100 in T330. Processes hereafter are the same as the processes of T162 to T182 of FIG. 6.

As above, in the case where the remaining amount of the color material in the single-purpose CTG mounted on the printer 100 becomes 0% before the process for shipping a new single-purpose CTG is executed, the SP server 10 sends the shipping request to the shipping server 50 (T314) and sends the code to the printer 100 (T330). That is, once the SP server 10 sends the shipping request to the shipping server 50, it immediately sends the code to the printer 100. Therefore, when the new single-purpose CTG is delivered to the user and it is mounted on the printer 100, the printer 100 can immediately execute the printing process using the new single-purpose CTG. That is, user convenience is improved.

Case D; FIG. 9

Next, Case D will be described with reference to FIG. 9. In Case D, the printer 100 cannot send a zero notification to the SP server 10 despite the remaining amount of the color material in the single-purpose CTG mounted on the printer 100 (i.e., CTG ID "123" (see T90)) having become 0%. Here, "the printer 100 cannot send a zero notification to the SP server 10" also includes a case where the printer 100 can send a zero notification to the SP server 10 but the SP server 10 cannot receive the zero notification (i.e., the zero notification cannot be communicated between the printer 100 and the SP server 10). An initial state of FIG. 9 is the same as the initial state of FIG. 5.

Processes same as T100 to T134 of FIG. 5 and T140 to T144 of FIG. 6 are executed. As a result, the remaining amount of the color material in the single-purpose CTG mounted on the printer 100 becomes 0%, and in response to that, the printer 100 sends a zero notification to the SP server 10 in T400. However, in the present case, the zero notification is not received by the SP server 10 due to an error occurring in the SP server 10, for example. The printer 100 determines that the sending of the zero notification has failed when it does not receive a response signal from the SP server 10 despite a predetermined time period having passed since the zero notification was sent to the SP server 10. In this case, the printer 100 causes the display unit 116 to display a notification screen SC3 in T402. The notification screen SC3 includes a message indicating that the sending of the notification has failed and a message prompting the user of the printer 100 to contact a support center established by the vendor of the printer 100. As a result, the user calls the support center and provides the serial number SN of the printer 100 to a worker in the support center. In a variant, contacting the support center may be performed by other communication means (e.g., by email) than by telephone.

After contacted by the user, the worker in the support center resolves the error in the SP server 10. As a result, communication between the SP server 10 and the printer 100 is enabled. Then, in T410, the worker inputs a code generation instruction including the serial number SN to the SP server 10. In this case, the SP server 10 obtains the code generation instruction (YES in S40) and generates in T412 a code "234xxx" including the next CTG ID "234" stored in the device table 40 in association with the serial number SN (S32). Then, in T420, the SP server 10 sends the generated code "234xxx" to the printer 100 (S34). Processes hereafter are the same as the processes of T162 to T182 of FIG. 6.

As above, when obtaining the code generation instruction (T410) before receiving a zero notification from the printer 100, the SP server 10 generates the code (T412) and sends this code to the printer 100 (T420). Thus, even in a situation where the SP server 10 cannot receive notifications from the printer 100, the SP server 10 can suitably send the code to the printer 100 according to the instruction from the worker.

Corresponding Relationships

The SP server 10 and the printer 100 are respectively an example of "server" and "printer (and external device)". The single-purpose CTG identified by the CTG ID "123" and the single-purpose CTG identified by the CTG ID "234" are respectively an example of "first color material cartridge" and "second color material cartridge". The CTG ID "123" and the CTG ID "234" are respectively an example of "first cartridge identification information" and "cartridge identification information (and second cartridge identification information)". 0%, 20%, and 50% are respectively an example of "first remaining amount threshold", "second remaining amount threshold", and "predetermined value". The code "123xxx" is an example of "first code information". The code "234xxx" is an example of "specific information" and "code information (and second code information)". The periodic notification and the zero notification are examples of "remaining amount information". The periodic notification in T110 of FIG. 5 and the periodic notification in T150 of FIG. 6 are respectively an example of "first remaining amount information" and "second remaining amount information". The shipping request in T114 of FIG. 5 is an example of "shipping instruction data". The code generation instruction inputted in T410 of FIG. 9 is an example of "sending instruction". The notification screen SC3 is an example of "procedure screen".

The process of S10, the process of S22, and the process of S32 in FIG. 4 are respectively an example of "receive remaining amount information", "output shipping instruction data", and "generate the code information". The processes of T102 and T112 in FIG. 5 and T142 and T152 in FIG. 6 are examples of "store, in the memory, a remaining amount of the color material in the first color material cartridge" executed by the "server". The process of S34 following YES in S10 and the process of S34 following YES in S40 are respectively an example of "send specific information to an external device in a case where the remaining amount information is received" and "send the specific information to the external device in a case where a sending instruction is obtained".

The processes of T104 in FIG. 5 and T144 in FIG. 6 are examples of "cause the print executing unit to execute a printing process". The processes of T100 and T110 in FIG. 5 and T140 and T150 in FIG. 6 are examples of "send to a server remaining amount information". The process of T160 in FIG. 6 is an example of "obtain specific information". The process of T162 in FIG. 6 is an example of "store the second code information" executed by the "printer". The processes of T126 and T132 in FIG. 5 and T164 and T172 in FIG. 6 are examples of "obtain, from the print executing unit, cartridge identification information". The process of T402 in FIG. 9 is an example of "cause the display unit to display a procedure screen".

(Variant 1) In T160 of FIG. 6, the SP server 10 may send an email including the code "234xxx" to the terminal 200 instead of sending the code "234xxx" to the printer 100. In this case, the printer 100 may obtain the code "234xxx" from the terminal 200 via a Near Field Communication (NFC) I/F in response to the user of the terminal 200 (i.e., the user of the printer 100) bringing the terminal 200 close to the printer 100. In another variant, the printer 100 may obtain the code "234xxx" from the terminal 200 via a Bluetooth (registered trademark, BT) I/F. In yet another variant, the user of the terminal 200 may directly input the code "234xxx" to the printer 100. In each of these variants, the terminal 200 is an example of the "external device". Further, the sending of the email including the code "234xxx" is an example of "send specific information to an external device in a case where the remaining amount information is received".

(Variant 2) In a case where the new single-purpose CTG is mounted in T124 of FIG. 5 before the remaining amount of the color material in the single-purpose CTG identified by the CTG ID "123" becomes 0%, the printer 100 may set the print permission flag 138 to OFF and cause the display unit 116 to display a restriction screen in T128. The restriction screen includes a message indicating that some color material is still remaining in the single-purpose CTG identified by the CTG ID "123", and a restriction cancel button. In this case, the printer 100 may set the print permission flag 138 to ON in a case of accepting an operation by the user on the restriction cancel button. In the present variant, the printer 100 displaying the restriction screen including the restriction cancel button is an example of "restrict the printing process".

(Variant 3) In the case where the print permission flag 138 indicates ON, the printer 100 may permit the execution of the printing process using the single-purpose CTG mounted on the printer 100 with the number of sheets (maximum number of sheets) set in the flat-rate printing service as an upper limit. In this case, the printer 100 may store the number of print mediums (number of sheets) used in the printing processes executed within a predetermined period, and may set the print permission flag 138 to OFF when this number of sheets exceeds the maximum number of sheets. In the present variant, the printer 100 permitting the execution of the printing process using the single-purpose CTG with the maximum number of sheets as its upper limit is an example of "permit the printing process".

(Variant 4) The SP server 10 may omit the processes of S14 to S24 in FIG. 4. In the present variant, "output shipping instruction data" may be omitted.

(Variant 5) The SP server 10 and the shipping server 50 may be integrated. In this case, the SP server 10 may display the user name UN and the shipping destination information in T114 of FIG. 5. By checking this display, the worker may ship a new single-purpose CTG with the shipping destination information as the destination (see T116) and may input the CTG ID of this single-purpose CTG to the SP server 10. In the present variant, displaying the user name UN and the shipping destination information is an example of "output shipping instruction data".

(Variant 6) The code may not include the CTG ID of a single-purpose CTG, and may, for example, be a hash value obtained by hashing the CTG ID of a single-purpose CTG. In this case, the printer 100 may generate a hash value by hashing the CTG ID read by the reader 119 and may determine whether the generated hash value matches a code (i.e., a hash value) received from the SP server 10. The printer 100 sets the print permission flag 138 to ON in a case where they match, while it sets the print permission flag 138 to OFF in a case where they do not match. In the present variant, the hash value is an example of the "code information (and specific information)". In another variant, the code may be the CTG ID itself of a single-purpose CTG. In general terms, the "code information" may be any information that is obtained by using the cartridge identification information.

(Variant 7) The SP server 10 may store the number of times a shipping request for the printer 100 has been sent to the shipping server 50 and may generate a code by adding the predetermined character string "xxx" to this number of times. Further, the printer 100 may store the number of single-purpose CTGs that have been newly mounted and may determine whether the number of times obtained from the code matches the stored number of single-purpose CTGs. The printer 100 may set the print permission flag 138 to ON in a case where they match, while it may set the print permission flag 138 to OFF in a case where they do not match. In the present variant, the code obtained by adding the predetermined character string "xxx" to the number of times is an example of the "specific information".

(Variant 8) In a case of receiving a zero notification from the printer 100 on which a specific single-purpose CTG is mounted (see T150 of FIG. 6, for example), the SP server 10 may send a predetermined command to the printer 100. The predetermined command is a command for instructing the printer 100 to set the print permission flag 138 to ON when a new single-purpose CTG is mounted on the printer 100 in place of the specific single-purpose CTG. In the present variant, the predetermined command is an example of the "specific information". Further, in the present variant, the process of S32 of FIG. 4 may be omitted. In the present variant, "generate the code information" executed by the "server" may be omitted, and "store the second code information" and "obtain, from the print executing unit, cartridge identification information" executed by the "printer" may be omitted.

(Variant 9) The threshold used in S14 of FIG. 4 may be "0%" instead of "20%". That is, the SP server 10 may execute both the process related to shipping a new single-purpose CTG and the process of generating and sending a code for the new single-purpose CTG when the remaining amount of the color material in the single-purpose CTG mounted on the printer 100 becomes 0%. In the present variant, the remaining amount of the color material in the first color material cartridge being equal to or less than the first remaining amount threshold is an example of "satisfies a predetermined condition".

(Variant 10) The SP server 10 may omit at least one of the processes of S14 and S16 in FIG. 4. Especially in a variant in which the process of S16 is omitted, "store, in the memory, a remaining amount of the color material in the first color material cartridge" executed by the "server" may be omitted.

(Variant 11) The process of S40 in FIG. 4 may be omitted. In general terms, "send the specific information to the external device in a case where a sending instruction is obtained" may be omitted.

(Variant 12) In the case where the sending of the zero notification fails in T400 of FIG. 9, the printer 100 may not display the notification screen SC3. In the present variant, the process of T402 may be omitted. In general terms, "cause the display unit to display a procedure screen" may be omitted.

(Variant 13) In the above embodiment, the processes of FIGS. 2 to 9 are implemented by software (e.g., programs 36, 136), however, at least one of these processes may be implemented by hardware such as a logic circuit.

What is claimed is:

1. A server comprising:
a controller,
wherein the controller is configured to:
receive remaining amount information related to a remaining amount of color material in a first color material cartridge from a printer on which the first color material cartridge is mounted, wherein the printer is configured to execute a printing process by using the first color material cartridge in a state where the first color material cartridge is mounted on the printer, and after a second color material cartridge is mounted instead of the first color material cartridge, the printer is configured to execute the printing process by using the second color material cartridge in a state where the second color material cartridge is mounted on the printer; and
send specific information to an external device in a case where the remaining amount information is received from the printer and the remaining amount of the color material in the first color material cartridge indicated by the remaining amount information is equal to or less than a first remaining amount threshold, wherein the specific information is for changing a state of the printer from a state in which the printing process using the second color material cartridge to be mounted instead of the first color material cartridge is restricted to a state in which the printing process using the second color material cartridge is permitted in a case where the specific information is obtained by the printer in response to the specific information being sent to the external device.

2. The server as in claim 1, wherein
the controller is further configured to:
output shipping instruction data in a case where the remaining amount information is received from the printer and the remaining amount of the color material in the first color material cartridge indicated by the remaining amount information satisfies a predetermined condition, the shipping instruction data being used to ship the second color material cartridge,
wherein in the case where the remaining amount information is received from the printer and the remaining amount of the color material in the first color material cartridge indicated by the remaining amount information is equal to or less than the first remaining amount threshold, the controller is configured to send to the external device the specific information that is code information obtained by using cartridge identification information for identifying the second color material cartridge that is to be shipped.

3. The server as in claim 2, wherein
the controller is configured to receive repeatedly the remaining amount information related to the remaining amount of the color material in the first color material cartridge from the printer on which the first color material cartridge is mounted,
in a case where first remaining amount information is received from the printer and a remaining amount of the color material in the first color material cartridge indicated by the first remaining amount information satisfies the predetermined condition, the controller is configured not to send the code information, and
in a case where second remaining amount information is received from the printer after the first remaining amount information has been received and a remaining amount of the color material in the first color material cartridge indicated by the second remaining amount information is equal to or less than the first remaining amount threshold, the controller is configured to send the code information.

4. The server as in claim 2, wherein
the controller is further configured to:
generate the code information by using the cartridge identification information in the case where the remaining amount information is received from the printer and the remaining amount of the color material in the first color material cartridge indicated by the remaining amount information is equal to or less than the first remaining amount threshold, and
the controller is configured to send the generated code information to the external device.

5. The server as in claim 2, wherein
the code information includes the cartridge identification information.

6. The server as in claim 2, wherein
the predetermined condition is satisfied in a case where the remaining amount of the color material in the first color material cartridge indicated by the remaining amount information is equal to or less than a second remaining amount threshold that is greater than the first remaining amount threshold.

7. The server as in claim 2, further comprising a memory,
wherein the controller is further configured to store, in the memory, a remaining amount of the color material in the first color material cartridge indicated by latest remaining amount information received from the printer, and the predetermined condition is satisfied in a case where a difference between the remaining amount of the color material in the first color material cartridge indicated by the remaining amount information and the remaining amount in the memory is equal to or greater than a predetermined value.

8. The server as in claim 1, wherein
the controller is further configured to:
send the specific information to the external device in a case where a sending instruction is obtained before the remaining amount information indicating that the remaining amount of the color material in the first color material cartridge is equal to or less than the first remaining amount threshold is received from the printer.

9. The server as in claim 1, wherein
the external device is the printer.

10. A printer comprising:
a print executing unit on which a color material cartridge is mounted; and
a controller,
wherein the controller is configured to:
cause the print executing unit to execute a printing process by using a first color material cartridge in a state where the first color material cartridge is mounted in the print executing unit;
after a second color material cartridge is mounted instead of the first color material cartridge, cause the print executing unit to execute the printing process by using the second color material cartridge in a state where the second color material cartridge is mounted on the print executing unit;
in a case where the first color material cartridge is being mounted on the print executing unit, send to a server remaining amount information related to a remaining amount of color material in the first color material cartridge; and
obtain specific information, wherein the specific information is sent from the server to an external device in a case where the remaining amount of the color material in the first color material cartridge indicated by the remaining amount information which has been sent to the server is equal to or less than a first remaining amount threshold,
wherein the controller is configured to:
before the specific information is obtained, restrict the printing process using the second color material cartridge to be mounted instead of the first color material cartridge; and
in a case where the specific information is obtained, permit the printing process using the second color material cartridge.

11. The printer as in claim 10, further comprising:
a memory configured to store first code information which is obtained by using first cartridge identification information for identifying the first color material cartridge,
wherein the specific information is second code information which is obtained by using second cartridge identification information for identifying the second color material cartridge,
the controller is further configured to:
store the second code information in the memory in a case where the second code information is obtained; and obtain, from the print executing unit, cartridge identification information for identifying a color material cartridge that is currently mounted on the print executing unit, and the controller is configured to:
restrict the printing process using the second color material cartridge in a case where the second cartridge identification information is obtained from the print executing unit before the second code information is obtained; and
permit the printing process using the second color material cartridge in a case where the second cartridge identification information is obtained from the print executing unit after the second code information has been obtained.

12. The printer as in claim 10, further comprising:
a display unit,
wherein the controller is further configured to:
in a case where the remaining amount information is unable to be sent to the server in a state where the remaining amount of the color material in the first color material cartridge is equal to or less than the first remaining amount threshold, cause the display unit to display a procedure screen that indicates a procedure for causing the server to send the specific information.

13. The printer as in claim 10, wherein
the external device is the printer, and
the controller is configured to obtain the specific information from the server.

14. A non-transitory computer-readable recording medium storing computer readable instructions for a server,
wherein the computer-readable instructions, when executed by a processor of the server, cause the server to:
receive remaining amount information related to a remaining amount of color material in a first color material cartridge from a printer on which the first color material cartridge is mounted, wherein the printer is configured to execute a printing process by using the first color material cartridge in a state where the first color material cartridge is mounted on the printer, and after a second color material cartridge is mounted instead of the first color material cartridge, the printer is configured to execute the printing process by using the second color material cartridge in a state where the second color material cartridge is mounted on the printer; and
send specific information to an external device in a case where the remaining amount information is received from the printer and the remaining amount of the color material in the first color material cartridge indicated by the remaining amount information is equal to or less than a first remaining amount threshold, wherein the specific information is for changing a state of the printer from a state in which the printing process using the second color material cartridge to be mounted instead of the first color material cartridge is restricted to a state in which the printing process using the second color material cartridge is permitted in a case where the specific information is obtained by the printer in response to the specific information being sent to the external device.

15. The non-transitory computer-readable recording medium as in claim 14, wherein
the computer-readable instructions, when executed by the processor, further cause the server to:

output shipping instruction data in a case where the remaining amount information is received from the printer and the remaining amount of the color material in the first color material cartridge indicated by the remaining amount information satisfies a predetermined condition, the shipping instruction data being used to ship the second color material cartridge, wherein in the case where the remaining amount information is received from the printer and the remaining amount of the color material in the first color material cartridge indicated by the remaining amount information is equal to or less than the first remaining amount threshold, the specific information that is code information obtained by using cartridge identification information for identifying the second color material cartridge that is to be shipped is sent to the external device.

16. The non-transitory computer-readable recording medium as in claim 15, wherein the remaining amount information related to the remaining amount of the color material in the first color material cartridge is received repeatedly from the printer on which the first color material cartridge is mounted, in a case where first remaining amount information is received from the printer and a remaining amount of the color material in the first color material cartridge indicated by the first remaining amount information satisfies the predetermined condition, the code information is not sent, and in a case where second remaining amount information is received from the printer after the first remaining amount information has been received and a remaining amount of the color material in the first color material cartridge indicated by the second remaining amount information is equal to or less than the first remaining amount threshold, the code information is sent.

17. The non-transitory computer-readable recording medium as in claim 15, wherein the computer-readable instructions, when executed by the processor, further cause the server to:

generate the code information by using the cartridge identification information in the case where the remaining amount information is received from the printer and the remaining amount of the color material in the first color material cartridge indicated by the remaining amount information is equal to or less than the first remaining amount threshold, wherein the generated code information is sent to the external device.

18. The non-transitory computer-readable recording medium as in claim 15, wherein the code information includes the cartridge identification information.

19. The non-transitory computer-readable recording medium as in claim 15, wherein the predetermined condition is satisfied in a case where the remaining amount of the color material in the first color material cartridge indicated by the remaining amount information is equal to or less than a second remaining amount threshold that is greater than the first remaining amount threshold.

20. A non-transitory computer-readable recording medium storing computer readable instructions for a printer, the printer comprising:

a print executing unit on which a color material cartridge is mounted; and a processor, wherein the computer-readable instructions, when executed by the processor, cause the printer to:

cause the print executing unit to execute a printing process by using a first color material cartridge in a state where the first color material cartridge is mounted on the print executing unit;

after a second color material cartridge is mounted instead of the first color material cartridge, cause the print executing unit to execute the printing process by using the second color material cartridge in a state where the second color material cartridge is mounted on the print executing unit;

in a case where the first color material cartridge is being mounted on the print executing unit, send to a server remaining amount information related to a remaining amount of color material in the first color material cartridge; and obtain specific information, wherein the specific information is sent from the server to an external device in a case where the remaining amount of the color material in the first color material cartridge indicated by the remaining amount information which has been sent to the server is equal to or less than a first remaining amount threshold, wherein before the specific information is obtained, the printing process using the second color material cartridge to be mounted instead of the first color material cartridge is restricted; and in a case where the specific information is obtained, the printing process using the second color material cartridge is permitted.

* * * * *